March 17, 1970　　　E. B. POOL　　　3,501,128
BALL VALVES

Filed July 7, 1966　　　　　　　　　　　　7 Sheets-Sheet 1

INVENTOR.
ELDERT B. POOL

BY

*Strauch, Nolan, Neale, Nies & Bronaugh*
ATTORNEYS

March 17, 1970     E. B. POOL     3,501,128
BALL VALVES Filed July 7, 1966     7 Sheets-Sheet 2

INVENTOR.
ELDERT B. POOL

BY Strauch, Nolan, Neale, Nies & Kurnaugh
ATTORNEYS

March 17, 1970  E. B. POOL  3,501,128
BALL VALVES

Filed July 7, 1966  7 Sheets-Sheet 3

INVENTOR.
ELDERT B. POOL
BY
Strauch, Nolan, Neale, Nies & Bromaugh
ATTORNEYS

March 17, 1970

E. B. POOL 3,501,128

BALL VALVES

Filed July 7, 1966

INVENTOR.
ELDERT B. POOL

BY

Strauch, Nolan, Neale, Nies & Kurz
ATTORNEYS

March 17, 1970  E. B. POOL  3,501,128
BALL VALVES

Filed July 7, 1966  7 Sheets-Sheet 5

INVENTOR.
ELDERT B. POOL
BY
ATTORNEYS

March 17, 1970 E. B. POOL 3,501,128
BALL VALVES
Filed July 7, 1966 7 Sheets-Sheet 6

INVENTOR.
ELDERT B. POOL
BY
ATTORNEYS

March 17, 1970

E. B. POOL 3,501,128

BALL VALVES

Filed July 7, 1966

INVENTOR.
ELDERT B. POOL
BY
Strauch, Nolan, Neale, Nies & Bronaugh
ATTORNEYS

United States Patent Office 3,501,128
Patented Mar. 17, 1970

3,501,128
BALL VALVES
Eldert B. Pool, Pittsburgh, Pa., assignor to Rockwell Manufacturing Company, Pittsburgh, Pa., a corporation of Pennsylvania
Filed July 7, 1966, Ser. No. 563,540
Int. Cl. F16k 25/00, 31/44, 5/06
U.S. Cl. 251—175
25 Claims

ABSTRACT OF THE DISCLOSURE

A ball valve having a ported, ball type valve plug assembly rotatably mounted in a valve body cavity and comprising an elastically deformable plug structure delimiting the fluid port in the assembly and a relatively rigid tube coaxially received in and beng substantally coextensive with the port for stiffening the plug structure. An operating stem is operatively connected directly to the stiffening tube, whereby valve-operating torque applied to the stem is transmitted directly to tube for turning the plug assembly between its valve opened and closed positions.

---

The present invention relates to ball type valves and particularly to improvements in elastically deformable ball valve members.

It has been proposed to form a ball valve member or plug from elastically deformable material to provide for its insertion into a valve body by forcing it through a fluid passage which is smaller than the ball diameter. The method and apparatus pertaining to the assembly of the elastically deformable valve member in the valve body in this manner is described by Mathew L. Freeman in his commonly assigned application Ser. No. 527,291, filed on Feb. 14, 1966 for Ball Valves.

Although ball valve structures as described in the preceding paragraph have several significant advantages, the fluid pressure range in which they are effective and practical is limited, since high fluid pressure differential loads distort the elastomeric valve member into the downstream fluid passage to an objectionable degree. A large amount of ball distortion into the downstream fluid passage is particularly undesirable because it increases the torque needed to turn the valve member from closed to opened positions. Under certain conditions, excessive torque applied in turning the elastically deformable ball valve member twists the operating stem tang out of its slot in the valve member.

Accordingly, it is a major object of this invention to provide an improved ball plug structure which is not subject to the shortcomings mentioned above. As a result, the valve structure of this invention is more effective for use at high fluid operating pressures.

More specifically, it is an object of this invention to provide a novel valve structure wherein a relatively rigid tube is received in the port of an elastically deformable ball type plug to stiffen and support the plug against distortion by fluid pressure.

Another related object is to provide a novel ball valve wherein excessive torque applied to turn an elastically deformable valve plug structure between opened and closed positions does not operatively disengage the operating stem from the plug assembly.

A further object of this invention is to provide a novel ball valve structure wherein excessive fluid pressure is vented into the downstream passage of the valve to prevent segments of a multi component valve plug from being blown into the downstream pipeline.

Further objects of this invention will appear as the description proceeds in connection with the appended claims and annexed drawings wherein:

Figure 1:
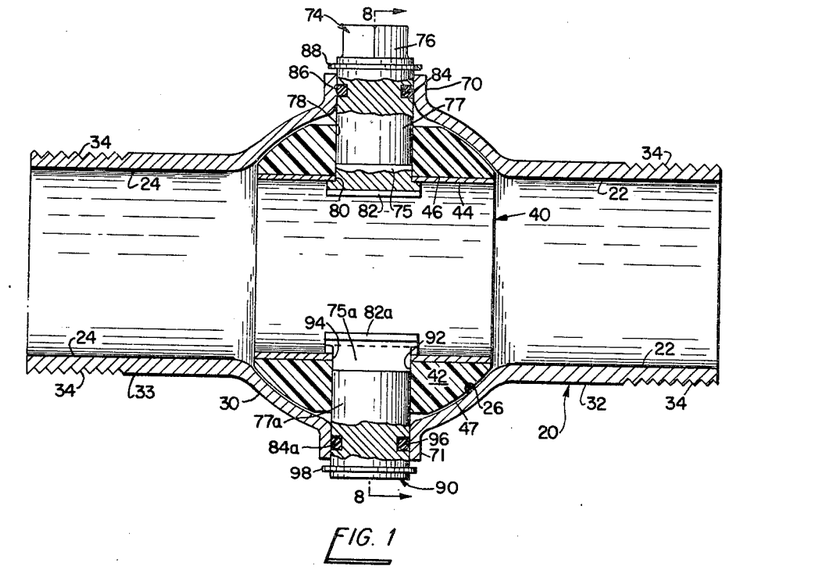
FIGURE 1 is a longtiudinal section of a ball valve assembly constructed according to a preferred embodiment of this invention.

Referring now to the drawings and more particularly to FIGURE 1, the valve, according to a preferred structural embodiment of this invention, comprises a rigid, one-piece, metal body 20 having opposed, axially aligned, similar, cylindrical fluid flow passages 22 and 24 on opposite sides of an enlarged central plug receiving cavity or chamber 26. The valve, as shown in this embodiment, is a two-way valve, and for purposes of this disclosure, passage 22 may be considered to be the outlet or downstream side and passage 24 may be considered to be on the inlet or upstream side.

As shown in FIGURE 1, the body 20 is formed with a spherically bulged section 30 which defines chamber 26. Uniformly diametered tubular sections 32 and 33, which define passages 22 and 24 respectively, are integrally joined to section 30 at the juncture of passages 22 and 24 with chamber 26. Sections 32 and 33 are externally threaded at 34 for attachment to a pipeline. The diameters of passages 22 and 24 respectively defined by tubular sections 32 and 33 are preferably equal to the internal diameter of the pipeline in which the valve of this invention is installed.

Still referring to FIGURE 1, chamber 26 is formed with a substantially spherical internal wall surface which smoothly merges with the interior of each of the sections 32 and 33. Body 20 is thus formed with a continuous, smooth, internal contour which is free of abrupt changes of configuration, sharp edges, recesses, and pockets.

Owing to its configuration, body 20 may conveniently be shaped from ductile pipe or tubing by conventional forming methods such as, for example, hydraulic forming. The tubing or pipe from which body 20 is formed preferably is of the same nominal size and has the same wall thickness as that of the pipeline for which the finished valve is sized.

Figure 2:
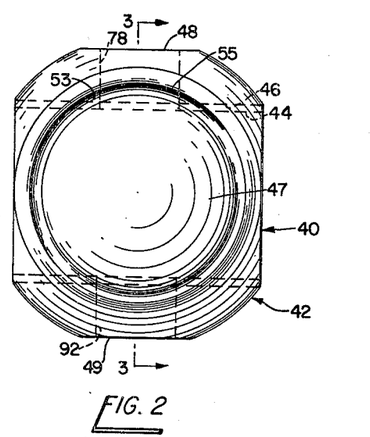
FIGURE 2 is a side elevation of the ball plug assembly shown in the valve of FIGURE 1.
Figure 3:
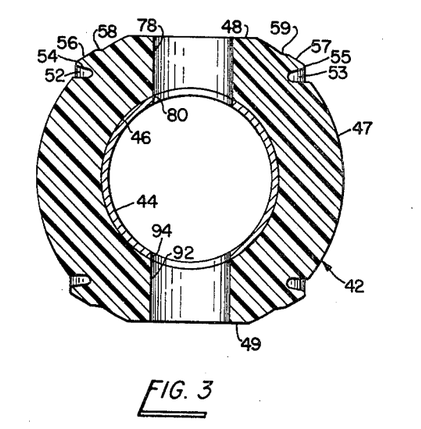
FIGURE 3 is a transverse section of the ball plug assembly taken substantially along lines 3—3 of FIGURE 2.

In accordance with this invention, a ball type plug assembly 40 is shown in FIGURES 1–3 to consist of a ported, elastically deformable, one piece ball sleeve 42 and a thin-walled, relatively rigid support tube 44. Suitable materials for forming ball sleeve 42 and which are regarded as being elastically deformable are, for example, urethane, rubber or Teflon. Sleeve 42 has a uniformly diametered, cylindrical, through port 46 in which support tube 44 is received.

When the valve is open, as shown in FIGURE 1, port 46 aligns and is substantially continuous with passages 22 and 24. At opposite ends, port 46 terminates in the spherical surface 47 of ball sleeve 42 which preferably otherwise comprises the entire outer surface of the ball sleeve except for top and bottom parallel flats 48 and 49 and sealing lips to be described shortly. Flats 48 and 49 are advantageous since they reduce the amount of material needed to form ball sleeve 42.

Still referring to FIGURES 1–3, surface 47 of ball sleeve 42 is contained in a uniformly diameter spherical envelope that mates with the internal spherical wall surface of chamber 26. Preferably, ball sleeve 42 is provided with two annular grooves 52 and 53 opening in axially opposite directions and defining identical, upstream and downstream, annular sealing lips 54 and 55. Lips 54 and 55 are raised relative to periphery 47 and respectively provide annular sealing surfaces 56 and 57. Sealing surfaces 56 and 57 and grooves 52 and 53 are concentric with a common axis normally intersecting the longitudinal axis of port 46. Surfaces 56 and 57 respectively smoothly merge with annular heels 58 and 59 formed behind lips 54 and 55.

Figure 4:
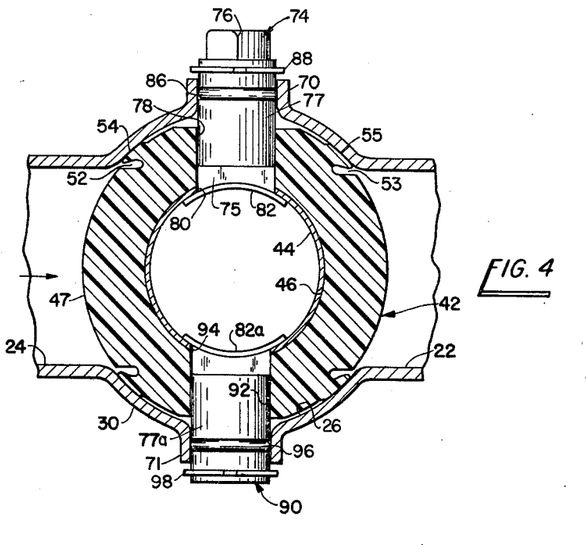
FIGURE 4 is a longtiudinal section illustrating the valve of FIGURE 1 in its closed position.

When plug assembly 40 is turned 90 degrees from its valve opened position shown in FIGURE 1 to its valve closed position shown in FIGURE 4 where flow of fluid through chamber 26 is blocked, sealing lips 54 and 55 respectively engage the inner, spherical periphery of chamber 26 surrounding the inner ends of passages 22 and 24 to establish upstream and downstream annular seals which are concentric about an axis aligning with the axes of passages 22 and 24. In valve closed position, groove 52 opens axially outwardly toward the inner end of passage 24 and groove 53 opens axially towards the inner end of passage 22.

As will be described in greater detail later on, sleeve 42 is inserted into cavity 26 by forcing it through either passage 22 or passage 24. Tube 44 is then inserted into port 46 after sleeve 42 is properly oriented in chamber 26. Before tube 44 is placed in port 46, lips 54 and 55 lightly contact the internal wall surface of section 30 when sleeve 42 is centered in chamber 26. The fit between tube 44 and sleeve 42 is only tight enough to hold tube 44 in place when plug assembly 40 is turned to its opened position during operation of the valve. As a result, the insertion of tube 44 into port 46 does not cause any significant compression of lips 54 and 55 against the internal, valve body wall surface. The contact of lips 54 and 55 against the wall surface of section 30 preferably is sufficient to provide initial upstream and downstream fluid tight seals in absence of any fluid pressure. Preferably, the volumes of grooves 52 and 53 are greater than the volumes of lips 54 and 55 to prevent binding and excessive operating torque.

Heels 58 and 59, at the end of lips 54 and 55 remote from the mouths of grooves 52 and 53, advantageously may be formed with equal diameters which are slightly larger than or at least equal to the internal diameter of body section 30. Heels 58 and 59, consequently, also contact the internal periphery of body section 30 to effect secondary annular seals behind their respective sealing lips. The remaining spherical periphery of ball sleeve 42 is relieved to a diameter that is slightly less than the interior diameter of body section 30 whereby only lips 54 and 55 and heels 58 and 59 seat against the internal body wall surface.

Support tube 44 is formed from any suitable material which is considerably more rigid than the elastomeric material used to form ball sleeve 42 to thereby effectively stiffen and support sleeve 42 against distortion by fluid pressure. Advantageously, support tube 44 may be made from metal tubing or other high strength material having a thin wall for maintaining a large fluid flow area through port 46. It will be appreciated that when plug assembly 40 is turned to its valve closed position, tube 44 prevents sleeve 42 from being blown out of the valve body by the fluid pressure differential acting across chamber 26.

Figure 5:
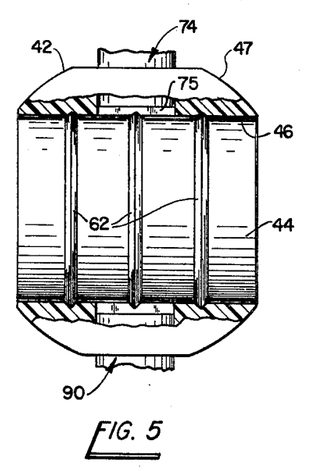
FIGURE 5 is a side elevation of a modified ball plug assembly wherein the outer elastically deformable sleeve is partially broken away to illustrate details of the stiffening tube received in the sleeve part.
Figure 6:
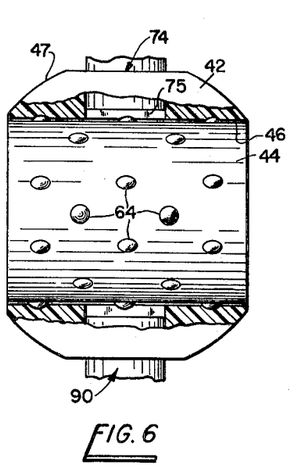
FIGURE 6 is a view similar to FIGURE 5, but showing another modified form of the stiffening tube.

Support tube 44, as shown in FIGURES 1–3, may be formed with smooth, concentric, cylindrical internal and external surfaces from end to end. Alternatively, tube 44 may be provided with concentric, raised, axially spaced apart annular ridges 62 (see FIGURE 5) on its exterior surface. Ridges 62 are embedded in ball sleeve 42 to more tightly secure tube 44 to sleeve 42 and thus prevent displacement of the tube by fluid flow through the valve. In place of ridges 62, support tube 44 may be provided with a series of radial, spaced apart, dimple like projections 64 (see FIGURE 6) which also embed in the ball sleeve material to thus more tightly engage tube 44 in port 46.

Figure 7:
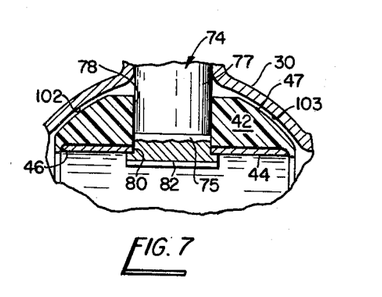
FIGURE 7 is a fragmentary longitudinal section of a ball valve assembly incorporating still another modified ball plug assembly.

As shown in FIGURE 7, support tube 44 may be formed at opposite ends with a spherical radius which is slightly less than the spherical radius to surface 47. Portions of ball sleeve 42 at opposite ends of port 46 may overhang and extend axially beyond opposite ends of tube 44 to prevent tube 44 from contacting the internal wall surface of body 20.

Figure 8:
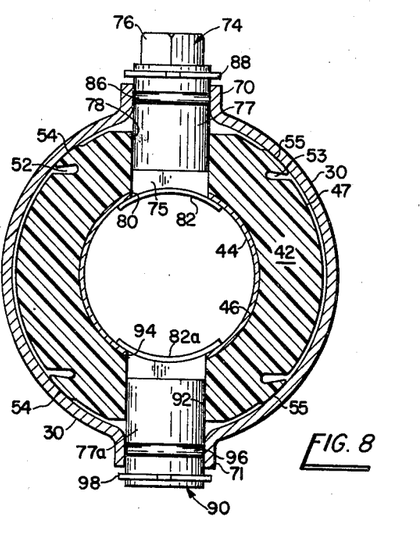
FIGURE 8 is a section taken substantially along lines 8—8 of FIGURE 1.

Referring to FIGURES 1 and 8, valve body 20 preferably is integrally formed with trunnion bearing collars 70 and 71 extending in opposite directions from the top and bottom of section 30. Collars 70 and 71 extend along a common axis medially intersecting chamber 26 and normally intersecting the longitudinal axis of port 46. A rigid valve operating stem 74 extending coaxially through collar 70 is formed at opposite ends with a drive tang section 75 and wrench engaging section 76. Sections 75 and 76 are essentially square in cross section and are integrally joined together by an intermediate, cylindrically smooth, trunnion section 77. Trunnion section 77 is journalled in collar 70 and coaxially extends into a bore 78 formed in ball sleeve 42. Section 75, at the inner end of stem 74, extends through a mating square aperture 80 formed in support tube 44 along an axis aligning with bore 78.

The inner end of drive tang section 75 received within support tube 44 terminates in a rectangular, relatively thin lip 82. Lip 82 extends beyond the edges of aperture 80 and is curved on all of its four sides to interfittingly seat against the internal periphery of tube 44. Lip 82 thus provides stop abutment surfaces for limiting axial outward displacement of stem 74 and is sufficiently thick to prevent stem 74 from being blown out of valve body 20 by internal fluid pressure. The inner periphery of lip 82 is a smooth, segmental, cylindrical surface extending in concentric relation to the internal wall surface of support tube 44.

The portion of trunnion section 77 received in collar 70 is formed with an annular groove 84 in which a resilient O-ring 86 is seated. O-ring 86 is radially compressed against the internal periphery of collar 70 to establish a fluid tight seal between stem 74 and body 20. A split washer 88 mounted on the outer end of trunnion section 77 limits inward displacement of stem 74.

It will be observed that stem 74 directly engages support tube 44 through bearing engagement of tang section 75 with the edges of aperture 80. Tube 44, in turn, bears against the large internal port surface of sleeve 42 for effectively turning assembly 40 against the frictional drag forces resulting from engagement of sleeve 42 with the interior wall surface of body 20. Thus, torque applied to stem 74 for turning plug assembly 40 between its valve opened and closed positions is transmitted directly to support tube 44 through interfaces which are considerably more rigid and stronger than ball sleeve 42.

With continued reference to FIGURES 1 and 8, a tube support member 90 rotatably extending through collar 71 is shown to be of the same construction as stem 74 except that it optionally is not provided with a wrench-engaging end section such as section 76. Like reference numerals suffixed by the letter $a$ have been used to identify the sections of member 90 which are the same as those of stem 74.

As shown, trunnion section 77a is journalled in bearing collar 71 and coaxially extends into a bore 92 formed in ball sleeve 42 along an axis axially aligning with that of bore 78. Tang section 75a extends through a square, mating aperture 94 formed in support tube 44 along an axis aligning with that of aperture 80. A resilient O-ring 96 seated in grooves 84a is compressed against the internal periphery of collar 71 to provide a fluid tight seal between member 90 and body 20.

A washer 98 mounted on the outer end of trunnion section 77a limits inward axial displacement of member 90. Outward axial displacement of member 90 is limited by bearing engagement of lip 82a against the internal periphery of support tube 44.

Apertures 80 and 94 in tube 44 are spaced 180 degrees apart and each have side edges which extend parallel to the longitudinal axis of the tube and which are joined by edges extending at right angles to the tube axis. Close interfitting engagement of tang sections 75 and 75a with the edges of apertures 80 and 94 thus retains ball sleeve 42 in a centered position throughout all degrees of rotation in opposition to fluid pressure differential loads tending to distort the sleeve into the downstream passage. As a result, only lips 54 and 55 contact the interior wall surface of body section 30. This minimizes the torque needed for turning plug assembly 40 between its valve opened and closed positions.

When plug assembly 40 is rotated to its valve closed position, as shown in FIGURE 4, upstream, high pressure fluid passes through the space between the relieved periphery of ball sleeve 42 and the interior wall surface of body section 30 and enters groove 52 to apply upstream pressure to the underside of lip 54. Lip 54 is thus snugly compressed with a high sealing force against the spherical wall periphery of chamber 26 surrounding the inner end of passage 24. When fluid flow through body 20 is reversed, high pressure fluid enters groove 53 to apply pressure to the underside of lip 55 with the result that lip 55 is tightly compressed against the interior wall surface of body section 30 surrounding the inner end of passage 22.

If the fluid pressure in chamber 26 builds up objectionably as a result of a temperature increase or other causes, heels 58 and 59 are distorted inwardly and lips 54 and 55 are sufficiently pressed into grooves 52 and 53 to dissipate the excess pressure into either passage 22 or passage 24.

When plug assembly 40 is turned to its valve closed position shown in FIGURE 4, the concentric upstream surfaces of ball sleeve 42 and support tube 44 are convex relative to the direction of fluid flow to resist distortion when sleeve 42 effects an upstream seal. Since tube 44 prevents sleeve 42 from being inwardly buckled by fluid pressure in the upstream passage, the fluid pressure circumferentially stretches the upstream side of sleeve 42 in opposite directions from a central point aligning with the axis of the upstream passage. Stretching of the upstream side of sleeve 42 in this manner may result in some slippage of the inner periphery of sleeve 42 along the engaged outer periphery of tube 44. This slippage, however, is sufficiently resisted by the interengagement of tube 44 and sleeve 42 to prevent leakage at high pressures.

In the manufacture of the valve structure shown in FIGURE 1, body 20, ball sleeve 42, support tube 44, stem 74, and member 90 are each separately formed by suitable, conventional methods preparatory to assembly. It will be appreciated that in forming body 20 all of the openings into chamber 26 are considerably smaller than the spherical diameter of ball sleeve 42.

After body 20 is formed, ball sleeve 42 is inserted into chamber 26 by forcing it through either passage 22 or passage 24. This may be accomplished by the method and apparatus described in the aforesaid application Ser. No. 527,291 wherein sleeve 42 is first oriented so that port 46 aligns with the fluid passage axis of body 20 and then is forced through either fluid passage by a hydraulic press. As sleeve 42 passes through either of the fluid passages it is distorted and elongated below its elastic limit. Once within chamber 26, therefore, sleeve 42 recovers its original shape except for any compression by lightly contacting lips 54 and 55 against the interior of body section 30.

After sleeve 42 is inserted into chamber 26, support tube 44 is inserted into port 46 by passing it through either of the fluid passages in body 20. The sub-assembly of stem 74 and O-ring 86 and the sub-assembly of member 90 and O-ring 96 are then separately inserted through either fluid passage and extended through tube 44, sleeve 42, and body 20. Washers 88 and 98 are then respectively mounted on stem 74 and member 80 to complete the assembly of the valve.

Figure 9:
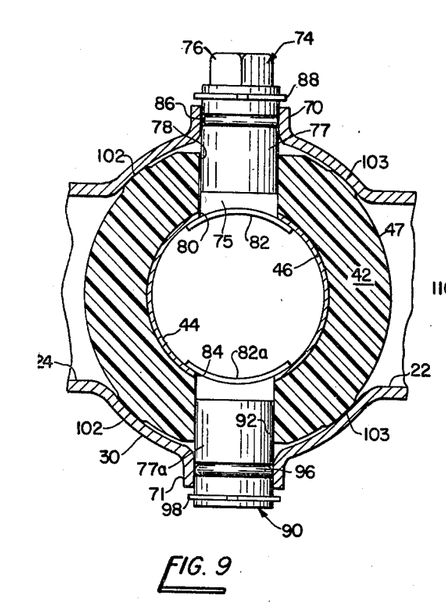
FIGURE 9 is a longitudinal section similar to FIGURE 4 but illustrating a modified valve ball sleeve having raised, ridge-like, annular sealing seats.

FIGURE 9 illustrates a modified valve plug assembly wherein lips 54 and 55 and grooves 52 and 53 are replaced with raised annular seats 102 and 103. Seats 102 and 103 are shown to be integral with sleeve 42 and are formed concentrically about a common axis which normally intersects the longitudinal axis of port 46. Seats 102 and 103 are radially seated against the inner wall surface of body section 30 to provide initial upstream and downstream seals under zero fluid pressure differential.

Figure 10:
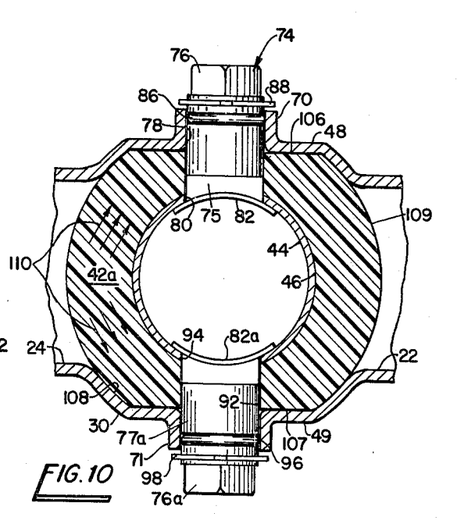
FIGURE 10 is a longitudinal section similar to FIGURE 4, but showing a modified body and ball sleeve construction having mating flats.

FIGURE 10 illustrates a modified valve body construction wherein section 30 is formed with top and bottom parallel flats 106 and 107. The interior wall surface of body section 30 is otherwise spherical as indicated at 108.

In the embodiment of FIGURE 10, plug assembly 40 is provided with a modified ball sleeve 42a. Sleeve 42a is the same as sleeve 42 except that it is provided with a uniformly diametered spherical surface 109 instead of having the raised seating surfaces shown in FIGURES 1 and 8. Accordingly, like reference numerals have been used to identify like portions of sleeves 42 and 42a. The interface between flats 106 and 48 and the interface between flats 107 and 49 are parallel and perpendicular to the aligned axes of stem 74 and member 90.

Sleeve 42a is oversized to make an interference fit along flats 106 and 107 and the interior, spherical body surface indicated at 108. Sleeve 42a is thus compressed against the interior of section 30 to provide upstream and downstream fluid tight seals surrounding the inner ends of passages 24 and 22.

The mating flats 106, 107, 48, and 49 reduce the volume of elastomeric material in sleeve 42a which is subject to distortion by fluid pressure and provides sleeve 42a with a greater amount of support. When sleeve 42a is in its valve closed position as shown in FIGURE 10, the high pressure in passage 24 urges the elastomeric sleeve material in the direction shown by the arrows at 110 to cause a larger volume of elastomeric material to be wedged between the converging spaces delimited by flats 106 and 107 and the opposing surfaces of tube 44. This provides for a tighter seal between sleeve 42a and body 20.

The ball valve assembly shown in FIGURE 10 is assembled in the same manner as described in connection with the valve structure of FIGURE 1. Upon insertion into chamber 26, ball sleeve 42a, being oversized, is compressed over its entire external surface. Sleeve 42a will assume a correct orientation in chamber 26 since, in this position, it is compressed the least. It will be appreciated that flats 48 and 49 reduce the amount of elastomeric material that must be distorted when forcing the ball sleeve through either of the valve body passages.

Either of the ball sleeves shown in FIGURES 1 and 9 may alternatively be used in the valve body shown in FIGURE 10.

Figure 11:
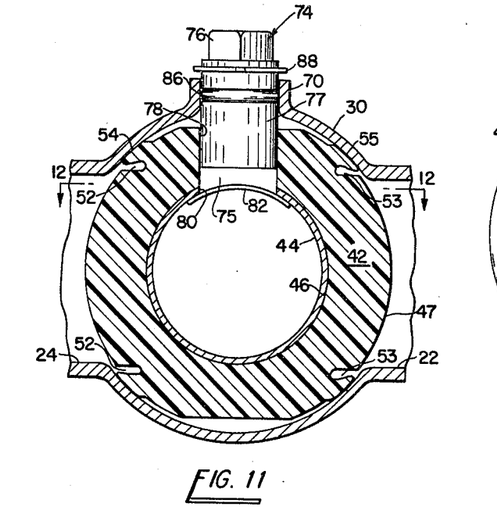
FIGURE 11 is a longitudinal section of a ball valve assembly constructed according to a further embodiment of this invention.
Figure 12:
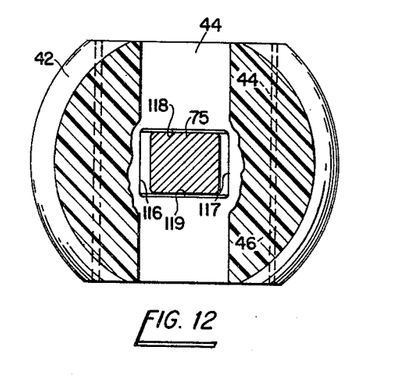
FIGURE 12 is a section taken substantially along lines 12—12 of FIGURE 11.

The modified valve structure in FIGURES 11 and 12 is the same as the valve illustrated in FIGURE 1 except that member 90 and collar 71 have been omitted and that aperture 80 has been elongated in a direction extending at right angles to the longitudinal axis of tube 44. As best shown in FIGURE 12, the elongated aperture for receiving tang section 75 is provided with opposed edges 116 and 117 extending parallel to the longitudinal axis of tube 44 and opposed edges 118 and 119 extending at right angles to edges 116 and 117. Edges 116 and 117 provide a loose fit with the opposing sides of tang section 75, and edges 118 and 119 provide a close, sliding fit with their related opposing sides of tang section 75. With this construction, plug assembly 40 is displaceable a limited distance along an axis extending at right angles to the axis of tube 44. In valve closed position, therefore, fluid pressure differential across chamber 26 causes plug assembly 40 to effectively float a limited distance in a downstream direction to effect a tight seal between body 20 and lip 55. In comparison, the fit between members 74 and 90 and tube 44 in the embodiments of FIGURES 1–10 prevent the plug assembly from floating downstream to maintain an upstream seal when a fluid pressure differential is applied across chamber 26. Applying a fluid pressure differential across the plug assembly in FIGURES 11 and 12, however, establishes a downstream seal.

Figures 13, 24:
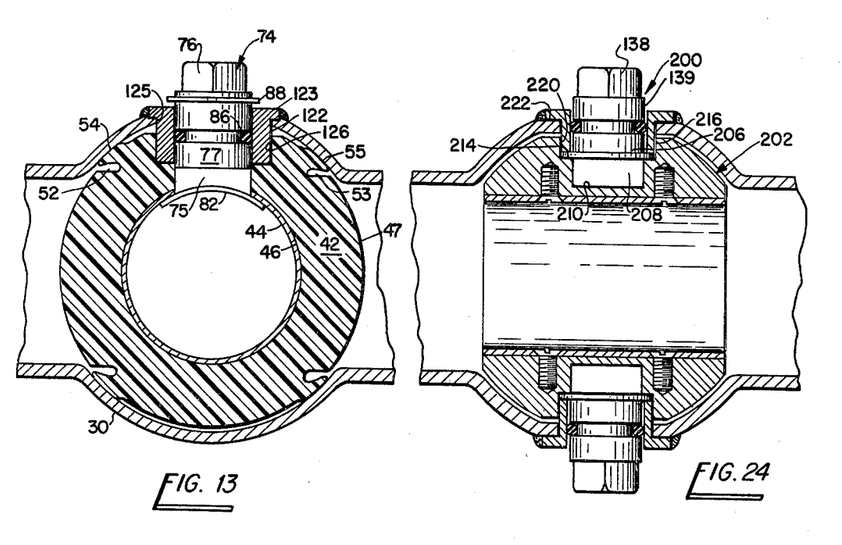
FIGURE 13 is a longitudinal section of a ball valve assembly constructed according to still another embodiment of this invention.
FIGURE 24 is a view similar to FIGURE 15 and illustrating a modified two-piece support stem for use in the valve shown in FIGURES 14–23.

The modified valve structure shown in FIGURE 13 is similar to the embodiment of FIGURES 11 and 12 except that the integral collar 70 is replaced with a separately formed stem bearing collar 122 which is fixed as by welding to section 30. Collar 122 has an annular radially extending shoulder 123 which seats on a recessed annular face surrounding a circular opening 125 in body section 30. Opening 125 is formed about an axis normally intersecting the longitudinal axis of body 20. Collar 122 extends downwardly through opening 125 and into an enlarged bore section 126 formed in ball sleeve 42 along an axis normally intersecting the longitudinal axis of port 46 and substantially aligning with the axis of opening 125. The valve structure shown in FIGURE 13 is otherwise the same as that of FIGURES 11 and 12. The plug assembly in FIGURE 13 therefore is displaceable a limited distance along an axis extending at right angles to the axis of port 46. As a result, a fluid pressure differential acting across chamber 26 causes the plug assembly to effectively float in a downstream direction to provide a tight downstream seal in the manner previously described.

It is to be noted that the trunnion section 77 of the valve stem shown in FIGURE 13 is considerably shorter than the valve stem trunnion section illustrated in FIGURE 11. As a result, the length of the stem in FIGURE 13 can be made longer without precluding its intersection through one of the valve body passages after sleeve 42 and tube 46 are placed in chamber 26.

To assemble the valve structure shown in FIGURE 13, sleeve 42 and tube 46 are first inserted into the valve body in the manner previously described. The valve stem is then inserted through one of the valve body passages and into tube 46 where it is tilted and inserted upwardly through the aligning holes in tube 46, sleeve 42, and section 30. Collar 122 is then slipped over the externally projecting end of the valve stem and advantageously welded to section 30 continuously around shoulder 123 to prevent leakage of fluid around the collar.

FIGURES 14–20 illustrate a further embodiment of this invention wherein plug assembly 40 is replaced with an assembly 130. To this extent that the valve structures of FIGURE 1 and of FIGURES 14–20 are alike, like reference numerals have been used to designate like parts except that the reference numerals employed for identifying the parts in FIGURES 14–20 have been suffixed by the letter b.

Figure 14:
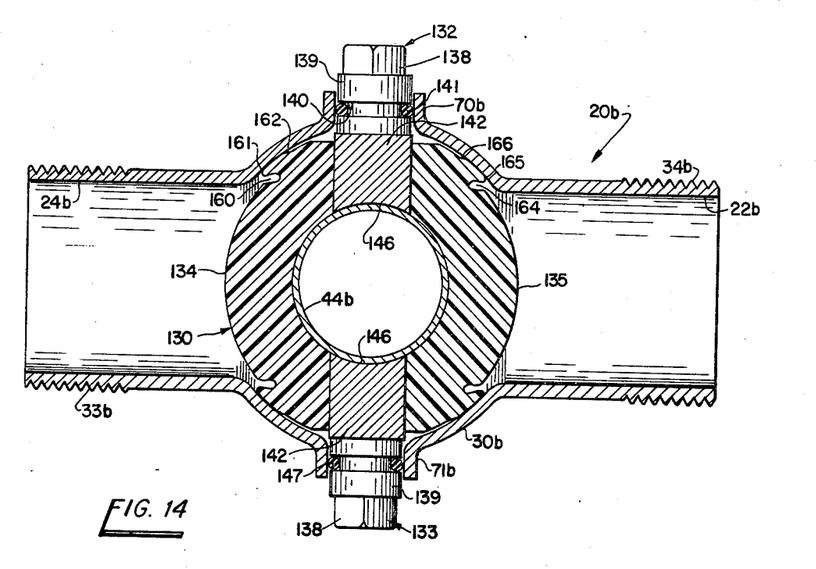
FIGURE 14 is a longitudinal section of a ball valve assembly constructed according to still another embodiment of this invention.
Figure 15:
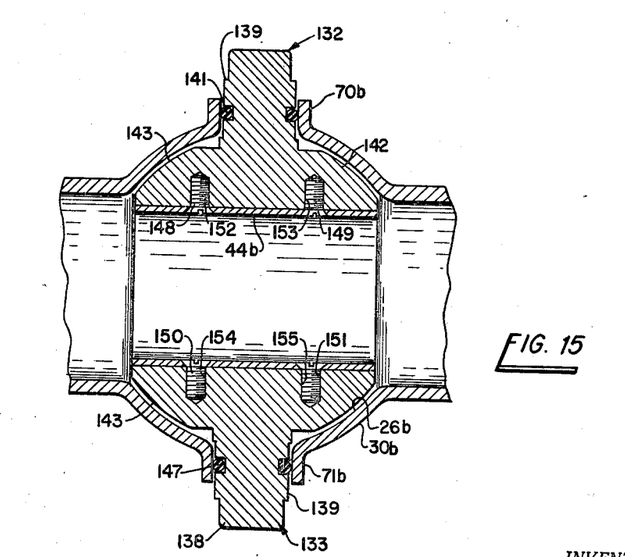
FIGURE 15 is a longitudinal section illustrating the valve of FIGURE 14 in its opened position.
Figure 16:
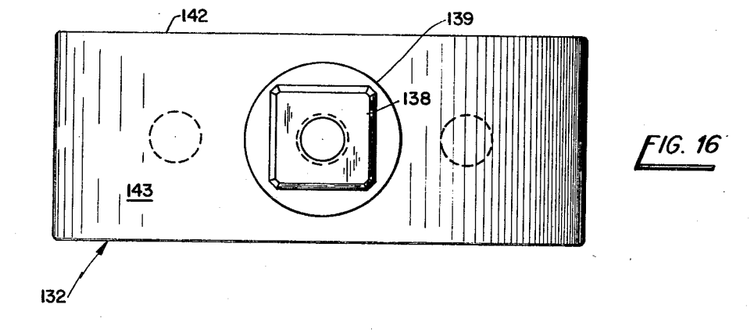
FIGURE 16 is a plan view of the upper valve plug stem support member shown in FIGURES 14 and 15.
Figure 17:
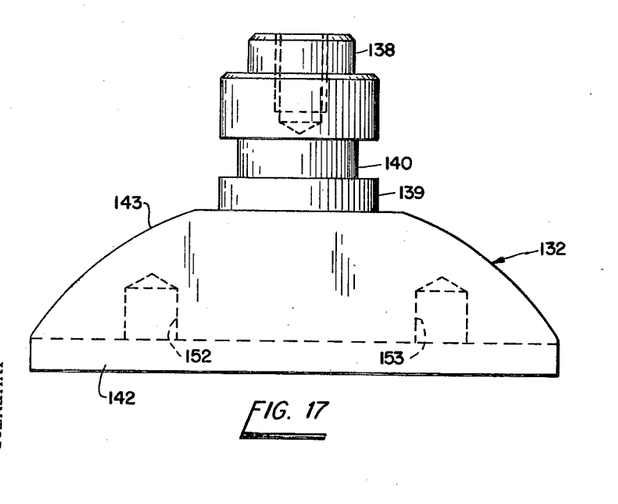
FIGURE 17 is a side elevation of the support member shown in FIGURE 16.
Figure 18:
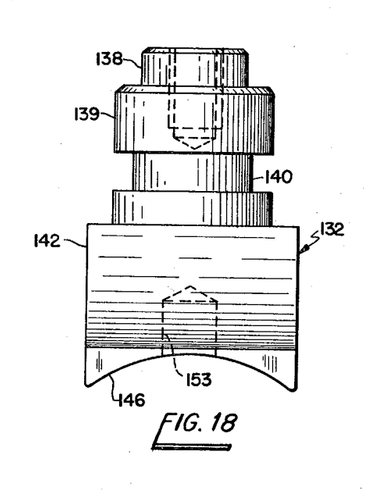
FIGURE 18 is an end elevation of the support member shown in FIGURES 16 and 17.

As shown in FIGURES 14 and 15, plug assembly 130 essentially consists of a pair of stem-trunnion members 132 and 133, a pair of elastomeric ball segments 134 and 135, and support tube 44b. Member 132 (see FIGURES 16–18) is formed at its outer end with an essentially square tool engaging end 138 and an intermediate, cylindrically smooth trunnion section 139. Trunnion section 139 is journalled within collar 70b and is formed with an annular outwardly opening groove 140 for receiving a resilient O-ring 141. O-ring 141 is compressed against the inner periphery of collar 70b to establish a fluid-tight seal between member 132 and body 20b.

At its inner end, trunnion section 139 is integrally joined to a plug drive section 142 which is formed with a segmental circular cross section to define a periphery 143 of uniform radius that mates with the internal spherical radius of body section 30b. Section 142 is parallel to the longitudinal axis of support tube 44b and is medially intersected by trunnion section 139. The inner end surface 146 of section 142 is curved to interfit with the outer periphery of tube 44b.

Member 133 preferably is of the same construction as member 132. Like reference numerals, therefore, have been used to designate like parts. Section 139 of member 133 is journalled in collar 71b as shown in FIGURES 14 and 15. A resilient O-ring 147 carried by section 139 of member 133 provides a fluid tight seal between member 133 and collar 71b. Member 133 optionally may be formed without the wrench-engaging section 138.

As shown in FIGURE 14, members 132 and 133 are seated on diametrically opposite regions of tube 44b. The stem axes of members 132 and 133 thus are aligned and spaced 180 degrees apart.

Tube 44b is secured to members 132 and 133 by conventional screws 148, 149, 150, and 151. Screws 148 and 149 extend through apertures in tube 44b and are engaged in parallel, axially spaced apart, tapped blind bores 152 and 153 formed in section 142 of member 132. Screws 150 and 151 extend through apertures in tube 44b diametrically opposite from screws 148 and 149 and are engaged in blind tapped bores 154 and 155 formed in section 142 of member 133.

By engaging stem section 138 with a wrench, the unitary sub-assembly of members 132 and 133 and tube 44b is rotatable about an axis normally intersecting the longitudinal axis of tube 44b. When member 132 is rotated, engagement of its section 142 with a segmental peripheral portion of tube 44b applies a torque couple to the tube to turn it between its valve opened and closed positions.

Referring to FIGURES 14, 15, 19, and 20, ball sleeve segment 134 is seated against the periphery of tube 44b between members 132 and 133. Segment 134 faces passage 24b when the valve is in closed position and has an internal, uniformly diametered periphery which interfits with the external periphery of tube 44b. The end faces of segment 134 are flat and interfittingly seat against the flat, upstream sides of sections 142 which are contained in a common plane.

Ball sleeve segment 135 is of the same construction as segment 134 and is seated on the opposite side of tube 44b facing passage 22b. The flat end faces of segment 135 interfittingly seat against the flat sides of sections 142 and are contained in a plane extending parallel to the plane containing the flat end faces of segment 134. The subassembly of segments 134 and 135 and sections 142 thus form a substantially continuous cylindrically smooth walled bore which defines the port of assembly 30 and which coaxially receives tube 44b.

As shown in FIGURE 14, ball sleeve segment 134 is formed with an annular groove 160 to provide a raised, annular sealing lip 161. An annular heel 162 is integrally formed behind lip 161. The configuration and arrangement of groove 160, lip 161, and heel 162 are the same as that shown in FIGURE 1. The remaining external periphery of segment 134 is contained in a spherical envelope of uniform diameter and is relieved to provide a free fit in chamber 26.

Ball sleeve segment 135 also is formed with an annular groove 164 to provide a raised, annular sealing lip 165 terminating in an annular heel 166. Groove 164, lip 165, and heel 166 are the same as the groove, lip, and heel on segment 134. Similar to segment 134, the remaining external periphery of segment 135 is contained in a spherical envelope and is relieved to provide a free fit in chamber 26b.

In assembled relation, lips 161 and 165 are concentric about a common axis normally intersecting the longitudinal axis of tube 44b. Grooves 160 and 164, as shown in FIGURE 14, open in axially opposite direction and respectively face passages 24b and 22b when plug assembly 130 is turned to its valve closed position. Lips 161 and 165 are compressed by tube 44b and members 132 and 133 against the interior of body 20b to thus provide annular fluid tight seals respectively surrounding the inner ends of passages 24b and 22b in the manner described for the embodiment of FIGURE 1. Although ball sleeve segments 134 and 135 are not secured to tube 44b or to members 132 and 133, they are confined between opposing surfaces so that they rotate as a unit with the subassembly of tube 44b and members 132 and 133. With this valve plug construction, fluid pressure differential loads cause only slight distortion of segments 134 and 135. As a result, the torque required for turning plug assembly 130 is minimized.

Figures 19, 20, 21, 22, 23:
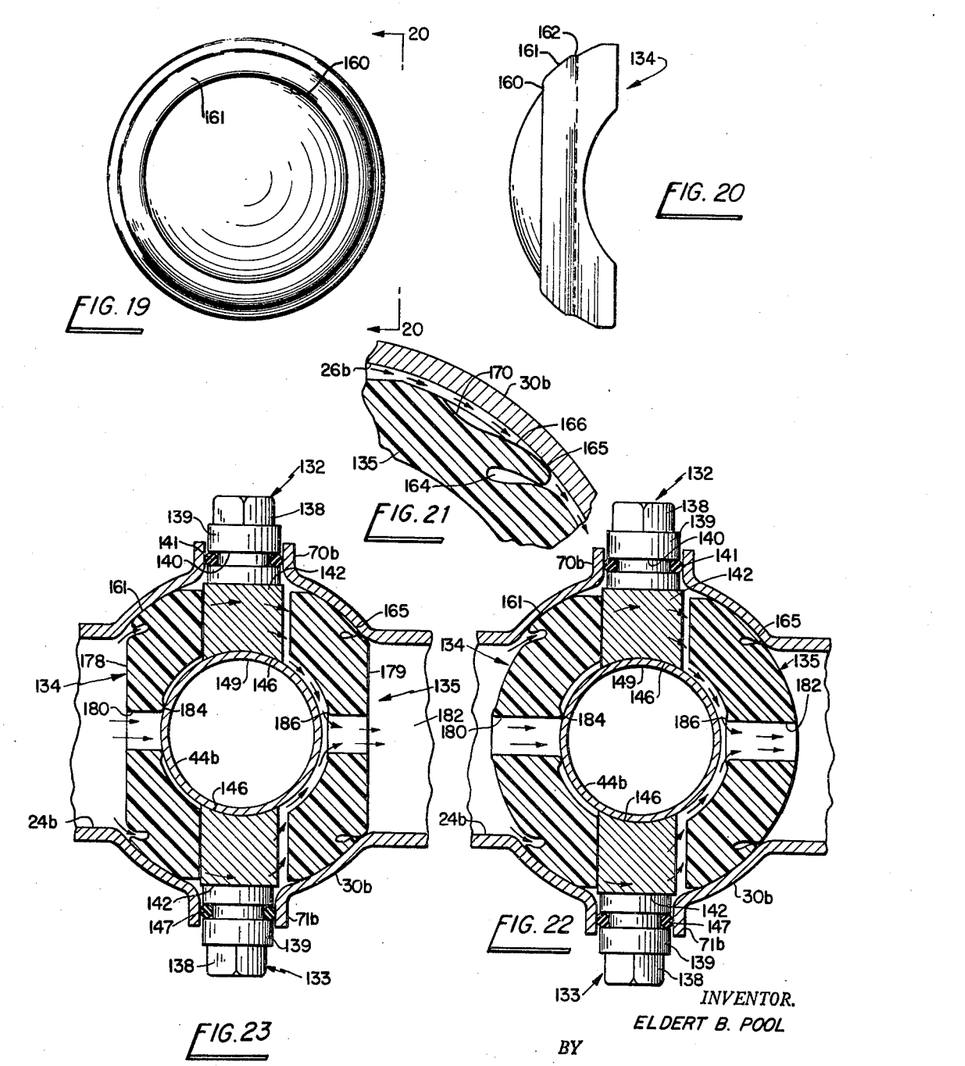
FIGURE 19 is an end elevation of one of the spherical ball sleeve segments shown in FIGURE 14.
FIGURE 20 is a side elevation of the ball sleeve segment shown in FIGURE 19.
FIGURE 21 is an enlarged fragmentary view of the ball valve shown in FIGURE 14 and illustrating a groove structure in the ball sleeve segment for venting the valve plug cavity to relieve excess fluid pressure.
FIGURE 22 is a fragmentary longitudinal section illustrating a modified form of ball plug construction for relieving excess fluid pressure.
FIGURE 23 is a view similar to FIGURE 22, but illustrating a modified form of the valve plug structure.

As shown in FIGURE 21, grooves 170 may be formed in heels 162 and 166 in the general direction of fluid flow through body 20b. When excessive pressure builds up in chamber 26b, the fluid distorts heels 162 and 166 inwardly. Grooves 170 allow the fluid to pass beyond the heels and to deflect the downstream one of the lips 161 and 165 into its groove. As a result, fluid communication is established between chamber 26b and the downstream passage to dissipate the excess pressure.

By providing sections 142 with longitudinally extending, segmental circular cross sections that interfit with the interior of body section 30b, sections 142 cooperate with tube 44b to effectively form a retaining wall medially dividing chamber 26b into two compartments and firmly supporting segments against distortion by fluid pressure differentials across cavity 26b.

To assemble the parts of the valve structure shown in FIGURES 14 and 15, segments 134 and 135 are first inserted through either of the fluid flow passages of the preformed valve body 20b. After segments 134 and 135 are positioned in chamber 26b, members 132 and 133 are then inserted through one of the fluid passages in body 20b and are respectively extended through collars 70b and 71b. Tube 44b is then inserted through one of the valve body passages and is slid into the open-ended fluid port defined by the inner, arcuate peripheries of members 132 and 133 and segments 134 and 135. Screws 148–151 are then inserted to secure tube 44b to members 132 and 133.

FIGURE 22 illustrates another modification of the segmental ball sleeve structure for dissipating excessive fluid pressure into the downstream passage. In this embodiment, segments 134 and 135 are respectively formed with straight, axially aligned through passages 180 and 182. Passages 180 and 182 respectively terminate at their inner ends in annular lips 184 and 186 which are raised and extend inwardly from the inner peripheries of segments 134 and 135. When plug assembly 130 is turned to its valve closed position, passages 180 and 182 axially align with passages 24b and 22b in valve body 20b. In this embodiment, segments 135 and 134 respectively face the downstream passage 22b and the upstream passage 24b when plug assembly 130 is in its valve closed position.

Under normal fluid pressure conditions in chamber 26b, lips 184 and 186 seat against the external periphery of tube 44b to provide fluid tight seals for preventing flow of fluid through passages 180 and 182. When the fluid pressure in chamber 26b becomes excessive, fluid flows between the opposed peripheries of segment 135 and tube 44b and forces lip 186 away from the periphery of tube 44b to establish fluid communication between chamber 26b and passage 182. The excess fluid pressure is thus dissipated through passage 182 and into the downstream line. When the excess pressure in chamber 26b is relieved, lip 186 re-seats on the periphery of tube 44b to block further flow of fluid through passage 182. The fluid pressure between segment 135 and tube 44b compresses lip 165 against the interior of body 20b and thus causes lip 165 to fold into groove 164 as shown. The upstream fluid pressure in passage 24b normally forces lip 184 against the periphery of tube 44b to thereby block fluid flow through passage 180. If flow of fluid is reversed so that segment 134 is on the downstream side in valve closed position, excessive fluid pressure in chamber 26b will be vented through passage 180 in the same manner.

Optionally, segments 134 and 135 may be truncated to provide oppositely facing planar lands 178 and 179 as shown in FIGURE 23. Lands 178 and 179 are contained in planes which extend in parallel relation with a medial plane containing the axis of tube 44b and the rotational axes of members 132 and 133. Truncation of segments 134 and 135 can be accomplished in this manner since the stiffening effect afforded by tube 44b eliminates the need for the additional plug segment material.

Truncating segments 134 and 135 in the foregoing manner is advantageous because it reduces the plug segment surfaces that might rub against the interior of the valve body. In addition, truncation of segments 134 and 135 reduces the thickness of these valve plug parts to render them more flexible. As a result, less fluid pressure differential is required to flex the downstream segment against the downstream seating surface as shown in FIGURE 22.

It will be appreciated that the valve plug segments in the valve structure which is illustrated in FIGURES 14 and 15 also may optionally be truncated in the manner described for the embodiment of FIGURE 23.

Referring now to FIGURE 24, each of the members 132 and 133, instead of being of one-piece construction, may optionally be formed as two separate parts which are respectively indicated at 200 and 202. Part 202 consists only of section 142, and part 200 consists of sections 138 and 139, an annular flange 206 and an inner end section 208.

As shown, flange 206 is axially between sections 139 and 208. Section 208 may be of essentially square configuration and is slidably seated in a mating recess 210 in part 202. Flange 206 is seated on an annular planar surface 214 formed in part 202 in surrounding relation to the mouth of recess 210.

Still referring to FIGURE 24, a collar 216, which is similar in construction to collar 122, extends into a mating cylindrically walled bore section 220 which is formed in part 202 beyond surface 214. The inner end of collar 216 seats on flange 206.

Collar 216 extends upwardly through a mating aperture in body section 30b and terminates at its outer end in a radially outwardly extending flange 222. In this embodiment, collar 70b may be omitted and flange 222 may overlie the outer periphery of section 30b as shown. Collar 216 is fixed to the valve body as by a continuous weld around flange 222 in the manner shown.

With continuing reference to FIGURE 24, section 139 is coaxially journalled in collar 216 and section 138 is disposed exteriorly of the collar for engagement by a wrench to turn the valve plug structure between its opened and closed positions. Part 200 is prevented from being blown out of the valve body by internal fluid pressure since flange 206 is firmly clamped between collar 216 and surface 214 on part 202.

Parts 200 and 216 are assembled and inserted into the valve body as a unit in the manufacture of valve structure shown in FIGURE 24.

What is claimed and desired to be secured by Letters Patent is:

1. A valve comprising a body having fluid inlet and outlet pasages opening at their inner ends into a valve plug cavity, a ball type plug assembly having a fluid flow port therethrough and being rotatable within said cavity between positions where it blocks and provides fluid communication between said passages, said assembly comprising elastically deformable plug means delimiting said port and a relatively rigid tube coaxially received in said port for stiffening said plug means against distortion by fluid pressure, said plug means providing annular seating surfaces for establishing fluid tight seals surrounding the inner ends of said passages when said assembly is in its valve closed position, and an operating stem member rotatably extending through said body and being directly engaged with said tube to transmit valve-operating torque directly to said tube for turning said assembly between said positions.

2. The valve defined in claim 1 wherein said cavity is formed with an internal, smoothly contoured, spherical wall surface of substantially uniform diameter and wherein said plug means contacts said spherical wall surface at least along said seating surfaces.

3. The valve defined in claim 2 wherein said seating surfaces are formed on raised seats each having a radius that is greater than the radius of curvature of the remaining periphery of said plug means, the internal spherical diameter of said cavity being at least equal to that of the remaining periphery of said plug means.

4. The valve defined in claim 3 wherein each of said seats comprises a lip concentrically extending over an annular outwardly opening groove formed in said plug means about an axis normally intersecting the longitudinal axis of said port.

5. The valve defined in claim 4 wherein said grooves open in axially opposite directions.

6. The valve defined in claim 1 wherein said plug means is a one-piece sleeve made of elastically deformable material and having a through bore defining said port and receiving said tube.

7. The valve defined in claim 6 wherein annular, axially spaced apart ridges are provided on said tube and are embedded in said sleeve to securely fix said tube in said port.

8. The valve defined in claim 6 wherein spaced apart dimple-like projections are provided on said tube and are embedded in said sleeve to securely fix said tube in said port.

9. A valve comprising a body having fluid inlet and outlet passages opening at their inner ends into a valve plug cavity, and a ball type valve plug assembly having a fluid flow port therethrough and being rotatable within said cavity between positions where it respectively blocks and provides fluid communication between said passages, said assembly comprising elastically deformable plug means delimiting said port and a relatively rigid tube coaxially received in said port for stiffening said plug means against distortion by fluid pressure, said plug means being integrally formed with annular seating surfaces for establishing fluid tight seals surrounding the inner ends of said passages when said assembly is in its fluid-blocking position, said plug means being a one-piece sleeve made of elastically deformable material and having a through bore defining said port and receiving said tube, the maximum diameter of said sleeve being greater than said passages, and said sleeve, when said tube is removed, being deformable below its elastic limit to a size that is smaller than the diameter of said passages, whereby said sleeve is insertable into said cavity through one of said passages, said body being a one-piece structure having (a) a spherically bulged section between said passages to form said cavity and (b) tubular sections defining said passages and being joined to said bulged sections at the juncture of said passages with said cavity, all of the openings into said cavity being smaller than the size of said sleeve.

10. A valve comprising a body having fluid inlet and outlet passages opening at their inner ends into a valve plug cavity, a ball type plug assembly having a fluid flow port therethrough and being rotatable within said cavity between positions where it respectively blocks and provides fluid communication between said passages, said assembly comprising elastically deformable plug means delimiting said port and a relatively rigid tube coaxially received in said port for stiffening said plug means against distortion by fluid pressure, said plug means being integrally formed with annular seating surfaces for establishing fluid tight seals surrounding the inner ends of said passages when said assembly is in its fluid-blocking position, said plug means being a one-piece sleeve made of elastically deformable material and having a through bore defining said port and receiving said tube, and a pair of substantially axially aligned, axially spaced apart support members rotatably mounted in said body and extending through aligned bores in said sleeve along an axis substantially normally intersecting the longitudinal axis of said port, said support members having non-circular tang sections extending through mating radial openings formed 180° apart in said tube and rigidly supporting said assembly against lateral displacement relative to its rotational axis, said assembly being rotatable between said positions by engagement of at least one of said tang sections with the edges of its associated opening.

11. A valve comprising a body having fluid inlet and outlet passages opening at their inner ends into a valve plug cavity, a ball type plug assembly having a fluid flow port therethrough and being rotatable within said cavity between positions where it respectively blocks and provides fluid communication between said passages, said assembly comprising elastically deformable plug means delimiting said port and a relatively rigid tube coaxially received in said port for stiffening said plug means against distortion by fluid pressure, said plug means being integrally formed with annular seating surfaces for establishing fluid tight seals surrounding the inner ends of said passages when said assembly is in its fluid-blocking position, said plug means being a one-piece sleeve made of elastically deformable material and having a through bore defining said port and receiving said tube, and a valve operating stem member for said assembly, said stem member being mounted in said body for rotation about an axis extending at right angles to the longitudinal axis of said port and extending through a bore in said sleeve, said stem member having at its inner end a non-circular section extending through a mating non-circular opening formed radially in said tube, said assembly being rotatable between said positions by engagement of said section with the edges of said opening.

12. A valve comprising a body having fluid inlet and outlet passages opening at their inner ends into a valve plug cavity, and a ball type plug assembly having a fluid flow port therethrough and being rotatable in said cavity between positions where it respectively blocks and provides fluid communication between said passages, said assembly comprising elastically deformable plug means delimiting said port and a relatively rigid tube coaxially received in said port for stiffening said plug means against distortion by fluid pressure, said plug means being integrally formed with annular seating surfaces for establishing fluid tight seals surrounding the inner ends of said passages when said assembly is in its fluid-blocking position, said plug means being a one-piece sleeve made of elastically deformable material and having a through bore defining said port and receiving said tube, and said sleeve extending axially beyond and overhanging the opposite ends of said tube to prevent said tube from contacting the internal wall surface of said body.

13. As valve comprising a body having fluid inlet and outlet passages opening at their inner ends into a valve plug cavity, a ball type plug assembly having a fluid flow port therethrough and being rotatable within said cavity between positions where it respectively blocks and provides fluid communication between said passages, said assembly comprising elastically deformable plug means delimiting said port and a relatively rigid tube coaxially received in said port for stiffening said plug means against distortion by fluid pressure, said plug means providing annular seating surfaces for establishing fluid tight seals surrounding the inner ends of said passages when said assembly is in its fluid-blocking position, and an operating stem member for rotating said assembly between the fluid communicating position where said port aligns with said passages and the fluid-blocking position where said port is at right angles to said passages, said assembly being rotatable between said positions by engagement of said stem member with edges of a radial opening formed in said tube.

14. A valve comprising a body having fluid inlet and outlet passages opening at their inner ends into a valve plug cavity, a ball type valve plug assembly having a fluid flow port therethrough and being rotatable within said cavity between positions where it respectively blocks and provides fluid communication between said passages, said assembly comprising elastically deformable plug means delimiting said port and a relatively rigid tube coaxially received in said port for stiffening said plug means against distortion by fluid pressure, said plug means providing annular seating surfaces for establishing fluid tight seals surrounding the inner ends of said passages when said assembly is in its fluid-blocking position, a pair of axially opposed members extending into said cavity on diametrically opposite sides of said tube, said members having opposed arcuate surfaces interfittingly seated against the periphery of said tube to support said tube therebetween, and means mounting said members on said body for rotation about a common axis, said plug means comprising a pair of separately formed segments made of elastically deformable material and being disposed circumferentially between said members on diametrically opposite sides of said tube.

15. The valve defined in claim 1 wherein said tube is coextensive with said port at least substantially throughout the entire length of said port.

16. The valve defined in claim 15 wherein said stem extends through and engages the edges of an aperture formed through said tube intermediate the opposite ends thereof.

17. A valve comprising a body having upstream and downstream fluid flow passages opening at their inner ends into a valve plug cavity, a ball type plug assembly having a fluid flow port therethrough and being rotatable within said cavity between positions where it respectively blocks and provides fluid communication between said passages, and an operating stem operatively connected to said assembly for turning said assembly between said positions, said assembly comprising elastically deformable plug means integrally formed with annular seating surfaces coacting with mating surfaces in said body for establishing fluid tight seals surrounding the inner ends of said passages when said plug assembly is in its fluid-blocking position, said deformable plug means being formed with at least one passageway extending transversely of said port and opening into one of said passages when said assembly is rotated to its fluid-blocking position and means forming a part of said assembly and cooperating with said plug means for blocking fluid communication between said passageway and said cavity when the fluid pressure is said one passage is at least equal to the pressure of fluid in said cavity and for establishing fluid communication between said passageway and said cavity when the fluid pressure in said cavity exceeds the fluid pressure in said one passage by a predetermined magnitude.

18. The valve defined in claim 11 wherein said opening is essentially rectangular in shape having opposed side edges extending parallel to the longitudinal axis of said tube and opposed end edges extending at right angles with the tube axis, said non-circular section having a close fit with said end edges and a loose fit with said side edges whereby said assembly, when in valve closed position to dispose the axis of said port at right angles to flow through said cavity, is displaceable a limited distance in a downstream direction by upstream fluid pressure.

19. The valve defined in claim 13 wherein said stem member is journalled in a collar formed integral with and extending outwardly from a bulged section of said body defining said cavity.

20. The valve defined in claim 13 comprising a bulged section forming a part of said body and defining said cavity, a separately formed collar journalling said stem member and being fixed to said bulged section, said collar extending into said cavity and into a bore formed in said plug means and receiving said stem member.

21. The valve defined in claim 13 wherein said stem member terminates within said tube in a shoulder, said shoulder being engageable with the inner periphery of said tube to limit axial outward displacement of said stem member.

22. The valve defined in claim 14 wherein said means rotatably mounting each of said members comprises a cylindrical section journalled in said body and being rigid with its associated member, one of said cylindrical sections providing an operating stem for rotating said assembly through the interfitting engagement of its associated member with the periphery of said tube.

23. The valve defined in claim 14 wherein each of said seats comprises a lip concentrically extending over an annular outwardly opening groove formed in each of said segments, the remaining spherical periphery of said segments being relieved to provide a clearance with the interior of said cavity, each lip terminating in a heel at the juncture of said lip with the spherical periphery of said segment remote from the mouth of said groove, at least one of said heels having outwardly opening grooves therein to provide fluid communication between the cavity regions on opposite sides thereof, the pressure of fluid passing through said grooves being effective, when it exceeds a predetermined value, to flex the associated one of said lips into its groove, whereby fluid in said cavity flows through the clearance and into the downstream one of said passages to dissipate excess fluid pressure.

24. The valve defined in claim 14 comprising means including a passageway formed through at least one of said segments for establishing fluid communication between said cavity and the downstream one of said passages to relieve excessive fluid pressure in said cavity.

25. The valve defined in claim 6 wherein said sleeve and said body are provided with mating flats along parallel interfaces extending at right angles to the rotational axis of said assembly.

References Cited

UNITED STATES PATENTS

| | | | |
|---|---|---|---|
| 270,065 | 1/1883 | Hickman | 285—382.5 X |
| 2,924,009 | 2/1960 | Mazeika | 285—382.5 X |
| 3,227,174 | 1/1966 | Yost | 251—315 X |
| 3,231,235 | 1/1966 | Anderson et al. | 251—315 X |
| 3,348,805 | 10/1967 | Sanctuary | 251—315 |

FOREIGN PATENTS

| | | |
|---|---|---|
| 1,012,501 | 7/1957 | Germany. |
| 594,227 | 5/1959 | Italy. |
| 112,333 | 11/1944 | Sweden. |

M. CARY NELSON, Primary Examiner

MICHAEL O. STURM, Assistant Examiner

U.S. Cl. X.R.

251—315

UNITED STATES PATENT OFFICE
CERTIFICATE OF CORRECTION

Patent No. 3,501,128   Dated March 17, 1970

Inventor(s) Eldert B. Pool

It is certified that error appears in the above-identified patent and that said Letters Patent are hereby corrected as shown below:

Column 1, line 5 of the Abstract of the Disclosure, change "beng substantally" to --being substantially--.
Column 2, line 1, change "longtiudinal" to --longitudinal--.
, line 9, change "longtiudinal" to --longitudinal--.
Column 3, line 45, change "and" to --are--.
Column 11, line 38, "pasages" should be --passages--.
Column 13, line 31, "As" should be --A--.
Column 14, line 28, "is" should be --in--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents